United States Patent
Hummel

(10) Patent No.: US 10,883,574 B2
(45) Date of Patent: Jan. 5, 2021

(54) HYBRID DRIVE TRAIN FOR A HYBRID-DRIVEN MOTOR VEHICLE

(71) Applicant: AUDI AG, Ingolstadt (DE)

(72) Inventor: Steffen Hummel, Flacht (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/344,088

(22) PCT Filed: Oct. 24, 2017

(86) PCT No.: PCT/EP2017/077207
§ 371 (c)(1),
(2) Date: Apr. 23, 2019

(87) PCT Pub. No.: WO2018/077905
PCT Pub. Date: May 3, 2018

(65) Prior Publication Data
US 2019/0323579 A1    Oct. 24, 2019

(30) Foreign Application Priority Data

Oct. 26, 2016   (DE) .......................... 10 2016 221 058

(51) Int. Cl.
*B60K 6/36* (2007.10)
*F16H 3/72* (2006.01)
(Continued)

(52) U.S. Cl.
CPC .............. *F16H 3/725* (2013.01); *B60K 6/26* (2013.01); *B60K 6/547* (2013.01); *B60W 10/11* (2013.01);
(Continued)

(58) Field of Classification Search
CPC .. F16H 3/00; F16H 3/725; B60K 6/26; B60K 6/547
(Continued)

(56) References Cited

U.S. PATENT DOCUMENTS 6,634,247 B2 * 10/2003  Pels .......................... B60K 6/26
74/329

FOREIGN PATENT DOCUMENTS

| CN | 104589994 A | 5/2015 |
| DE | 197 45 995 A1 | 9/1998 |

(Continued)

OTHER PUBLICATIONS

Notification of Transmittal of Copies of Translation of the International Preliminary Report on Patentability dated May 9, 2019, in connection with corresponding International Application No. PCT/EP2017/077207 (9 pgs).

(Continued)

*Primary Examiner* — William C Joyce
(74) *Attorney, Agent, or Firm* — Maier & Maier, PLLC

(57) ABSTRACT

A hybrid drive train for a hybrid-driven vehicle. A transmission which can be shifted into different transmission stages by shifting elements and which can be drivingly connected to an internal combustion engine via an internal combustion engine shaft, to an electric machine via an electric machine shaft, and to at least one vehicle axle via an output shaft. The internal combustion engine shaft and a takeoff shaft, which is drivingly connected to the output shaft, can be connected together via spur gear sets which can be shifted by means of the shifting elements, each spur gear set forming a gear plane, of which at least one hybrid gear plane can additionally be connected to the electric machine shaft.

6 Claims, 3 Drawing Sheets

(51) Int. Cl.
  *B60K 6/26* (2007.10)
  *B60W 10/11* (2012.01)
  *B60W 20/30* (2016.01)
  *B60K 6/547* (2007.10)
  *F16H 3/08* (2006.01)

(52) U.S. Cl.
  CPC ..... *B60W 20/30* (2013.01); *F16H 2003/0826* (2013.01)

(58) Field of Classification Search
  USPC .......................................................... 74/661
  See application file for complete search history.

(56) References Cited

FOREIGN PATENT DOCUMENTS

| | | |
|---|---|---|
| DE | 199 45 474 A1 | 4/2000 |
| DE | 10 2008 031 456 A1 | 1/2010 |
| DE | 10 2010 030 567 A1 | 12/2011 |
| DE | 10 2011 101 151 A1 | 12/2011 |
| DE | 10 2013 005 252 A1 | 10/2014 |
| DE | 10 2013 206 176 A1 | 10/2014 |
| DE | 10 2013 210 013 A1 | 12/2014 |
| DE | 10 2014 013 579 A1 | 3/2015 |
| DE | 10 2014 109 169 * | 1/2016 |
| EP | 2 056 391 A1 | 5/2009 |
| EP | 2 204 894 A1 | 7/2010 |
| EP | 2 792 523 A2 | 10/2014 |
| EP | 2 808 197 A1 | 12/2014 |
| WO | 2008/138387 A1 | 11/2008 |
| WO | 2010/047207 A1 | 4/2010 |
| WO | 2011/002921 A2 | 1/2011 |
| WO | 2011/064986 A1 | 6/2011 |
| WO | WO 2014/006016 * | 1/2014 |
| WO | 2014/166745 A1 | 10/2014 |
| WO | 2015/140617 A1 | 9/2015 |

OTHER PUBLICATIONS

Examination Report dated Jul. 14, 2017 of corresponding German application No. 10 2016 221 058.0; 16 pages.
International Search Report and Written Opinion of the International Searching Authority dated Jan. 23, 2018 in corresponding International application No. PCT/EP2017/077207; 30 pages.

* cited by examiner

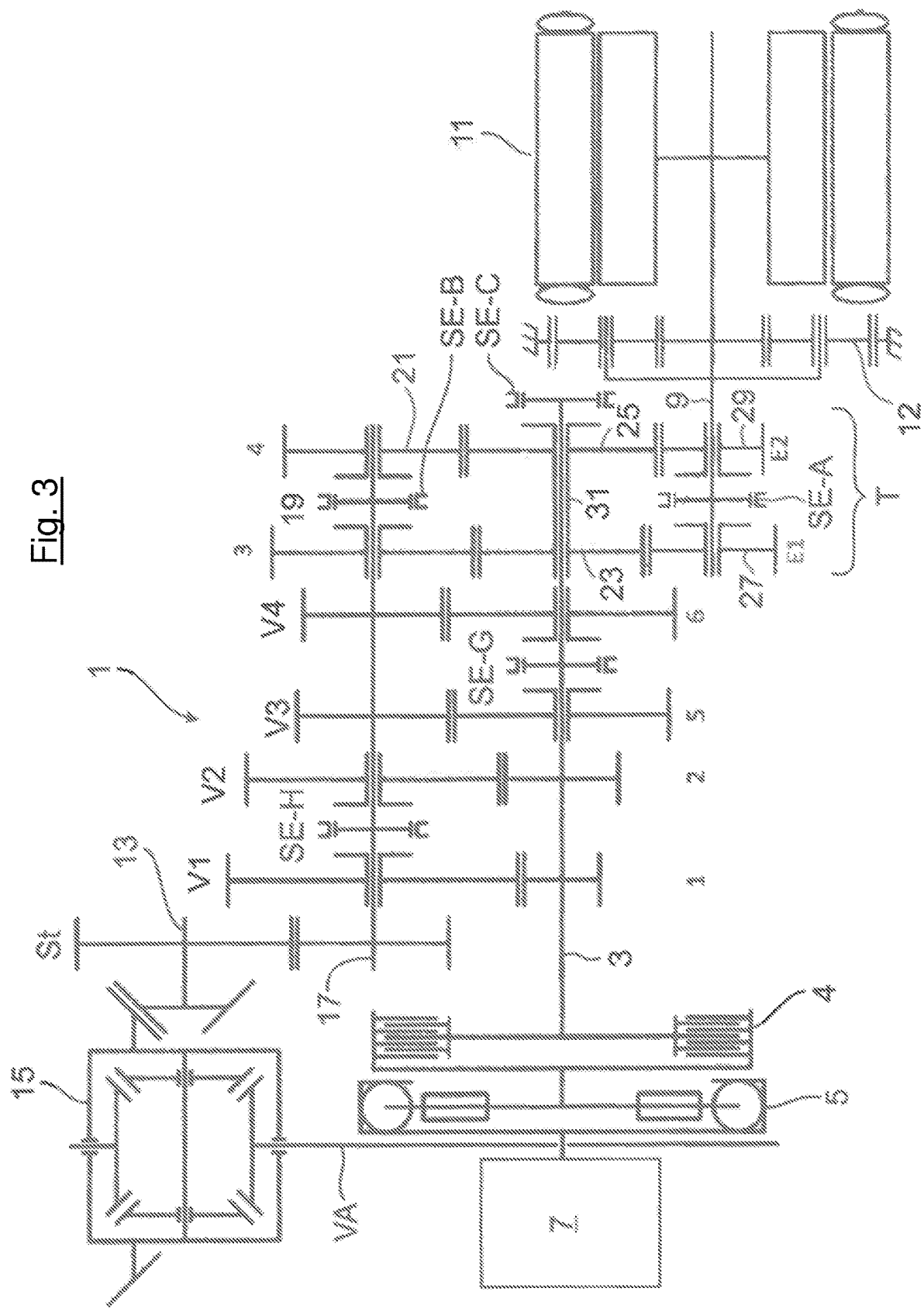

HYBRID DRIVE TRAIN FOR A HYBRID-DRIVEN MOTOR VEHICLE

FIELD

The invention relates to a hybrid drive train for a hybrid-drive motor vehicle.

BACKGROUND

From EP 2 792 523 A2, a hybrid drive train for a hybrid-driven vehicle according to the preamble is known. Said hybrid drive train has a transmission which can be shifted into different transmission stages by means of shifting elements and which can be drivingly connected to an internal combustion engine via an internal combustion engine shaft, to an electric machine via an electric machine shaft, and to at least one vehicle axle via an output shaft. The internal combustion engine shaft can be connected to a takeoff shaft via spur gear sets forming gear planes. The takeoff shaft in turn outputs to the output shaft via a spur gear stage. The gear planes of the hybrid drive have a hybrid gear plane which is drivingly connected to the electric machine shaft.

SUMMARY

The aim of the invention includes providing a hybrid drive train which exhibits greater degrees of freedom in functionality compared to the prior art, in a structurally simple, installation space-saving construction.

According to the characterizing part of Claim 1, the hybrid gear plane E1, E2 is part of a sub-transmission T which has shifting elements SE-A, SE-B, SE-C, by means of which the sub-transmission T can be decoupled from the drive train or can be coupled thereto during the operation of the transmission. The hybrid gear plane E1, E2 of the sub-transmission T can therefore be immobilized during the operation of the transmission and decoupled from the remaining activated part of the transmission. Accordingly, the transmission can be driven exclusively electrically, while the internal combustion engine is immobilized. Conversely, the electric machine can also be completely decoupled from the drive train.

On the electric machine shaft, at least one shifting element SE-A can be arranged, by means of which the electric machine can be decoupled from the hybrid gear plane E1, E2 or connected thereto. In this manner, in the case of shifted internal combustion engine gears, the electric machine can be completely decoupled from the drive train. This advantageously results in a reduction of the moment of inertia of the activated sub-transmission.

In a technical transmission, the hybrid gear plane E1, E2 can be constructed from a takeoff-side gear wheel arranged on the takeoff shaft, a drive-side gear wheel arranged on the internal combustion engine shaft, and a gear wheel arranged on the electric machine shaft. The gear wheel arranged on the electric machine shaft can be rotationally mounted as a loose gear wheel on the electric machine shaft and decoupled from the electric machine shaft or can be coupled thereto by means of the shifting element SE-A.

In a preferred embodiment, the transmission can comprise exactly two hybrid gear planes E1, E2. The shifting element SE-A arranged on the electric machine shaft can be capable of being switched on both sides and can be arranged in axial direction between the loose gear wheels of the two hybrid gear planes E1, E2. In a neutral position, the shifting element SE-A can be decoupled from the two hybrid gear planes. In addition, the shifting element SE-A can either couple the loose gear wheel of the first hybrid gear plane E1 to the electric machine shaft in a first shifting position or it can couple the loose gear wheel of the second hybrid gear plane E2 to the electric machine shaft in a second shifting position.

It is preferable if the electric machine shaft is completely free of fixed gear wheels, arranged in a rotationally fixed manner thereon, of the spur gear sets forming the gear planes of the transmission.

In addition, it is preferable if the transmission is designed as an exclusively spur gear transmission, in which the internal combustion engine, the electric machine shaft, and the output shaft can be drivingly connected to one another exclusively via spur gear sets. In this manner, a transmission structure of simple construction is achieved, which can be operated considerably more efficiently in comparison to a planet gear transmission.

In another preferred embodiment, the two hybrid gear planes can be directly adjacent in the axial direction and be assembled together to form the sub-transmission which can be immobilized during the operation of the transmission, that is to say which can be decoupled from the drive train. For the implementation of such a sub-transmission, each of the hybrid gear planes E1, E2 can in each case have a takeoff-side gear wheel arranged on the takeoff shaft, which is implemented as loose gear wheel and which can be coupled to the takeoff shaft by means of a shifting element SE-B. In addition, the drive-side gear wheels of the two hybrid gear planes E1, E2, which are arranged on the internal combustion engine shaft, can also be implemented as loose gear wheels. Said gear wheels are preferably arranged together in a rotationally fixed manner on a drive-side hollow shaft. The hollow shaft is rotationally mounted coaxially on the internal combustion engine shaft and can be coupled via exactly one shifting element, namely SE-C, to the internal combustion engine shaft. The above-mentioned shifting element SE-B arranged on the takeoff shaft can be implemented so it can be shifted on both sides and can be arranged in axial direction between the takeoff-side loose gear wheels of the two hybrid gear planes E1, E2.

The shifting element arranged on the electric machine shaft can be implemented as desired, for example, as a powershift dual clutch or as a non-powershift dual synchronization. In addition, the electric machine can be connected on the drive side or the takeoff side in the transmission. In the case of a drive-side connection, the gear wheel of the hybrid gear plane E1, E2, which is arranged on the electric machine shaft, can mesh with a drive-side loose gear wheel rotationally mounted on the internal combustion engine shaft. In a takeoff-side connection, the gear wheel of the hybrid gear plane E1, E2, which is arranged on the electric machine shaft, can mesh with a takeoff-side loose gear wheel which is rotationally mounted on the takeoff shaft.

The above hybrid design can be implemented based on a conventional manual transmission in a simple manner and it can be used especially for front-wheel drive. The rear axle can optionally be mechanically decoupled from the front axle, but is drivable via separate electric machines in order to implement a four-wheel drive. In the above hybrid design, the electric machine can be positioned preferably at the end of the transmission.

The advantageous embodiments and/or developments of the invention which are explained above and/or described in the dependent claims, —except, for example, in cases of clear dependencies and/or incompatible alternatives—can be used individually or else also in any combination with one another.

BRIEF DESCRIPTION OF THE DRAWINGS

The invention and its advantageous designs and developments as well as its advantages are explained in greater detail below in reference to drawings.

The drawings show:

FIG. 3 in a view corresponding to FIG. 1, a third embodiment of the hybrid transmission.

DETAILED DESCRIPTION

Figure 1:
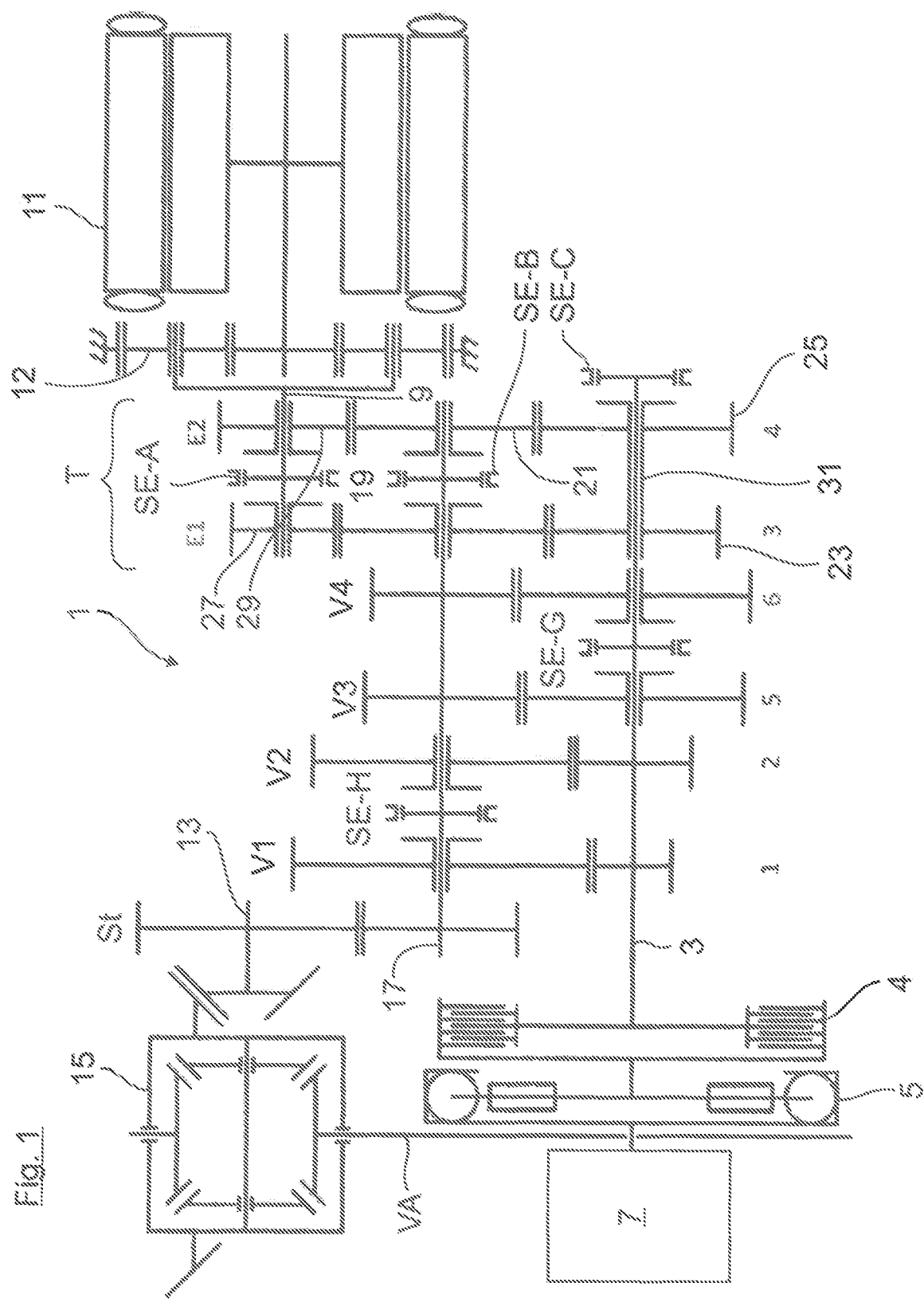
FIG. 1 a transmission structure of a hybrid transmission implemented as a spur gear manual transmission according to a first embodiment example.

In FIG. 1, a manual transmission 1 is shown, which is part of a hybrid drive train of a hybrid-driven motor vehicle not represented. The transmission 1 which can be shifted by means of shifting elements into different transmission stages is connected via an internal combustion engine shaft 3 with inserted decoupler 4 and torsion damper 5 to an internal combustion engine 7 and via an electric machine shaft 9 to an electric machine 11. For torque conversion, the electric machine 11 can comprise a planetary reduction gearing 12, represented in FIG. 1. In addition, the transmission 1 is drivingly connected on the output side via an output shaft 13 to a front axle VA of the motor vehicle. The output shaft 13 as pinion shaft is in operative connection with the bevel gear of a front axle differential 15.

As is moreover apparent from FIG. 1, the internal combustion engine shaft 3, the electric machine shaft 9 and a takeoff shaft 17 arranged in between are arranged in an axis-parallel manner with respect to one another. The takeoff shaft 17, the electric machine shaft 9 and the output shaft 13 can be drivingly connected to one another via the spur gear sets which can be shifted via the shifting elements. The spur gear sets form gear planes V1 to V4 and E1 as well as E2 which are arranged parallel to one another and which are all located in axial direction between the internal combustion engine 7 and the electric machine 11 according to FIG. 1.

Below, the transmission structure of the hybrid drive 1, which is shown in FIG. 1, is described: Thus, in FIG. 1, the internal combustion engine shaft 3 and the takeoff 17 are connected to one another via gear planes V1 to V4 which are each constructed from mutually meshing loose and fixed gear wheels. The loose gear wheels of the gear planes V1 to V4 can be coupled to the respective supporting shaft 3, 17 via shifting elements SE-H and SE-G. The gear planes V1 to V4 have no connection with respect to the electric machine shaft 9.

In addition, two hybrid gear planes E1, E2 are provided. Each hybrid gear plane E1, E2 has a takeoff-side gear wheel 19, 21 which is arranged on the takeoff shaft 17 and each of which meshes with a drive-side gear wheel 23, 25 arranged on the internal combustion engine shaft 3, and with a respective (electric machine-side) loose gear wheel 27, 29 arranged coaxially with respect to the electric machine shaft 9. The takeoff-side gear wheels 19, 21 of the hybrid gear planes E1, E2 are arranged in FIG. 1 as loose gear wheels on the takeoff shaft 17. Accordingly, their drive-side gear wheels 23, 25 are also rotationally mounted as loose gear wheels on the internal combustion engine shaft 3. Between the electric machine-side loose gear wheels 27, 29 of the hybrid gear planes E1, E2, a shifting element SE-A which can be shifted on both sides is arranged, by means of which as well either the first hybrid gear plane E1 or the second hybrid gear plane E2 can be coupled to the electric machine shaft 9. The takeoff shaft 17 outputs to the output shaft 13 via a spur gear stage St.

In the neutral position of the shifting element SE-A shown in FIG. 1, the electric machine shaft 9 is decoupled from the drive train. In this manner, the electric machine shaft 9 is immobilized during the operation of the transmission, i.e., deactivated. Thereby, the moment of inertia of the remaining activated transmission is advantageously reduced.

As is moreover apparent from FIG. 1, the hybrid gear planes E1, E2 are assembled to form a common sub-transmission T which can be shifted completely without torque during the operation of the transmission, that is to say which can be completely decoupled from the drive train, so that the sub-transmission T is completely immobilized. In the sub-transmission T, in FIG. 1, the two takeoff-side gear wheels 19, 21 of the hybrid gear planes E1, E2 are rotationally mounted as loose gear wheels on the takeoff shaft 17. Between the two takeoff-side gear wheels 19, 21 of the hybrid gear planes E1 and E2, a shifting element SE-B is arranged. In the represented neutral position, the shifting element SE-B is decoupled from the two hybrid gear planes E1, E2 and can be shifted axially on both sides. I.e., either the first or the second hybrid gear plane E1, E2 can be coupled to the takeoff shaft 17. In addition, in FIG. 1, the two drive-side gear wheels 23, 25 of the hybrid gear planes E1, E2 are arranged in a rotationally fixed manner together on a drive-side hollow shaft 31 which is rotationally mounted coaxially on the internal combustion engine shaft 3. The drive-side hollow shaft 31 can be coupled to the internal combustion engine shaft 3 in a manner with reduced number of components via exactly one shifting element SE-C.

The transmission 1 shown in FIG. 1 has a total of 16 gear wheels and five synchronizations. In the transmission 1, it is possible to shift six internal combustion engine direct gears VM1 to VM6 which use only one gear plane, but no internal combustion engine torsion gears which use at least two gear planes:

In the direct gears VM1 and VM2, the shifting element SE-H is shifted to the left or to the right, while the sub-transmission T is immobilized. In the direct gear VM3, SE-C is shifted to the left and SE-B to the left. This means that the sub-transmission T (with both hybrid gear planes E1, E2) is activated. The same also applies to the direct gear VM4 in which SE-C is shifted to the left and SE-B is shifted to the right. In the direct gears VM5 and VM6, the sub-transmission T is deactivated. In the direct gear VM5, SE-G is shifted to the left. In the direct gear VM6, SE-G is shifted to the right.

In exclusively electric motor operation, the sub-transmission T is always activated, and up to four electric motor gears can be shifted, that is to say the following two direct gears EM1, EM2 as well as two torsion gears EM3 to EM4:

Thus, in the direct gear EM1, the shifting element SE-A is shifted to the left and the shifting element SE-B is shifted to the left. In the direct gear EM2, the shifting element SE-A is shifted to the right, and the shifting element SE-B is shifted to the right.

In the electric motor torsion gear EM3, the shifting element SE-A is actuated to the left and the shifting element SE-B is actuated to the right. This results in a load path which extends from the electric machine 11 via the shifting element SE-A, the first hybrid gear plane E1 to the drive-side hollow shaft 31 and which extends from there to the takeoff shaft 17 via the second hybrid gear plane E2 and the shifting element SE-B.

In the electric motor torsion gear EM4, the shifting element SE-A is actuated to the right, and the shifting element SE-B is actuated to the left. This results in a load path which extends from the electric machine 11 via the shifting element SE-A, the second hybrid gear plane E2 to the drive-side hollow shaft 31 and which extends from there to the takeoff shaft 17 via the first hybrid gear plane E1 and the shifting element SE-B.

From the above internal combustion engine gears VM1 to VM6 and the electric motor gears EM1 to EM4, in combination, hybrid gears can be implemented, in which electric motor and internal combustion engine gears are shifted in combination.

Below, special types of driving modes which can be implemented by means of the transmission 1 shown in FIG. 1 are pointed out:

Thus, by means of the transmission structure shown in FIG. 1, standstill charging of the electric machine 11 is possible, if the vehicle is in vehicle standstill, for example, at a traffic light or in a traffic jam. In this case, for example, both the shifting element SE-C and also the shifting element SE-A can be actuated to the left, in order to connect the internal combustion engine shaft 3 via the first hybrid gear plane E1 to the electric machine 1. Thereby, a torque flow can occur from the internal combustion engine 7 to the electric machine 11 via the internal combustion engine shaft 3 and the first hybrid gear plane E1.

In addition, by means of the electric machine 11, an internal combustion engine start can be carried out. The electric machine 11 can start the internal combustion engine 7 via a load path in which, for example, the shifting element SE-A is actuated to the right, and the shifting element SE-C is actuated to the left.

Furthermore, in FIG. 1, a shifting process can occur between the internal combustion engine gears VM1, VM2, VM5 and VM6 with the help of the electric machine 11 without interruption of traction, and namely with the help of the electric motor gears EM1, EM2 which act as auxiliary gears during internal combustion engine shifting. Such a shifting process is started with an opening of the decoupler 4 in order to decouple the internal combustion engine 7 from the transmission 1. During the shifting process occurring between the internal combustion engine gears, an inserted electric motor auxiliary gear makes available an auxiliary load path which extends from the electric machine 11 to the drive side. During the shifting process (that is to say when the internal combustion engine 7 is decoupled from the drive train by means of the decoupler 4), the electric machine 11 can thus generate a drive torque which is transmitted to the takeoff side via the auxiliary load path.

The above situation is explained below in reference to a shifting process without interruption of traction, between the fifth and the sixth internal combustion engine gear, during which shifting process the electric motor second gear EM2 acts as auxiliary gear: Thus, in the transmission 1 of FIG. 1, in the internal combustion engine fifth gear VM5, the shifting element SE-G is shifted to the left. Thereby, a load path extends from the internal combustion engine 7, the gear plane V3, the takeoff shaft 17 to the takeoff-side spur gear drive St, while the sub-transmission T is deactivated (immobilized). At the beginning of the shifting process, the decoupler 4 is released, and the shifting element SE-G is shifted into its neutral position. In addition, the electric motor gear EM2 acting as auxiliary gear is inserted, that is to say the shifting element SE-A and the shifting element SE-B are both actuated to the right, and the electric machine 11 is started. This results in load transmission from the electric machine 11 to the takeoff side, during which the electric machine 11 generates a torque which can be adjusted as desired.

The shifting process into the target gear VM6 is continued, in that the shifting element SE-G is shifted from its neutral position to the right. Thereby, a load path from the internal combustion engine 7 via the shifting element SE-G, the gear plane V4 and the takeoff shaft 17 up to the takeoff-side spur gear drive St is set up. At the end of the shifting process, the decoupler 4 is closed again, that is to say the internal combustion engine 7 is started up, and the electric machine 11 is turned off again, so that the target gear VM6 is shifted, and a load transmission from the internal combustion engine 7 to the takeoff side occurs again.

In contrast to shifting processes between the internal combustion engine gears VM1, VM2, VM5 and VM6, a shifting process between the internal combustion engine third gear VM3 and the internal combustion engine fourth gear VM4, that is to say between the hybrid gear planes E1 and E2, cannot be assisted by means of an electric motor gear. In the transmission 1 shown in FIG. 1, during the above shifting process, no auxiliary load path can be provided by the electric machine 11, since the internal combustion engine 7 and the electric machine 11 both output via the common shifting element SE-B to the takeoff shaft 17. Thus, in FIG. 1, no shifting without interruption of traction is possible between the third and the fourth internal combustion engine gear.

In addition, by means of the transmission 1 shown in FIG. 1, an electric motor startup from vehicle standstill or a boost operation is possible, in which multiple electric motor gears for individual internal combustion engine gears are available for boosting.

In FIG. 1, an electric motor reverse gear is provided, in which the electric machine 11 is to be operated in reverse direction.

Figure 2:
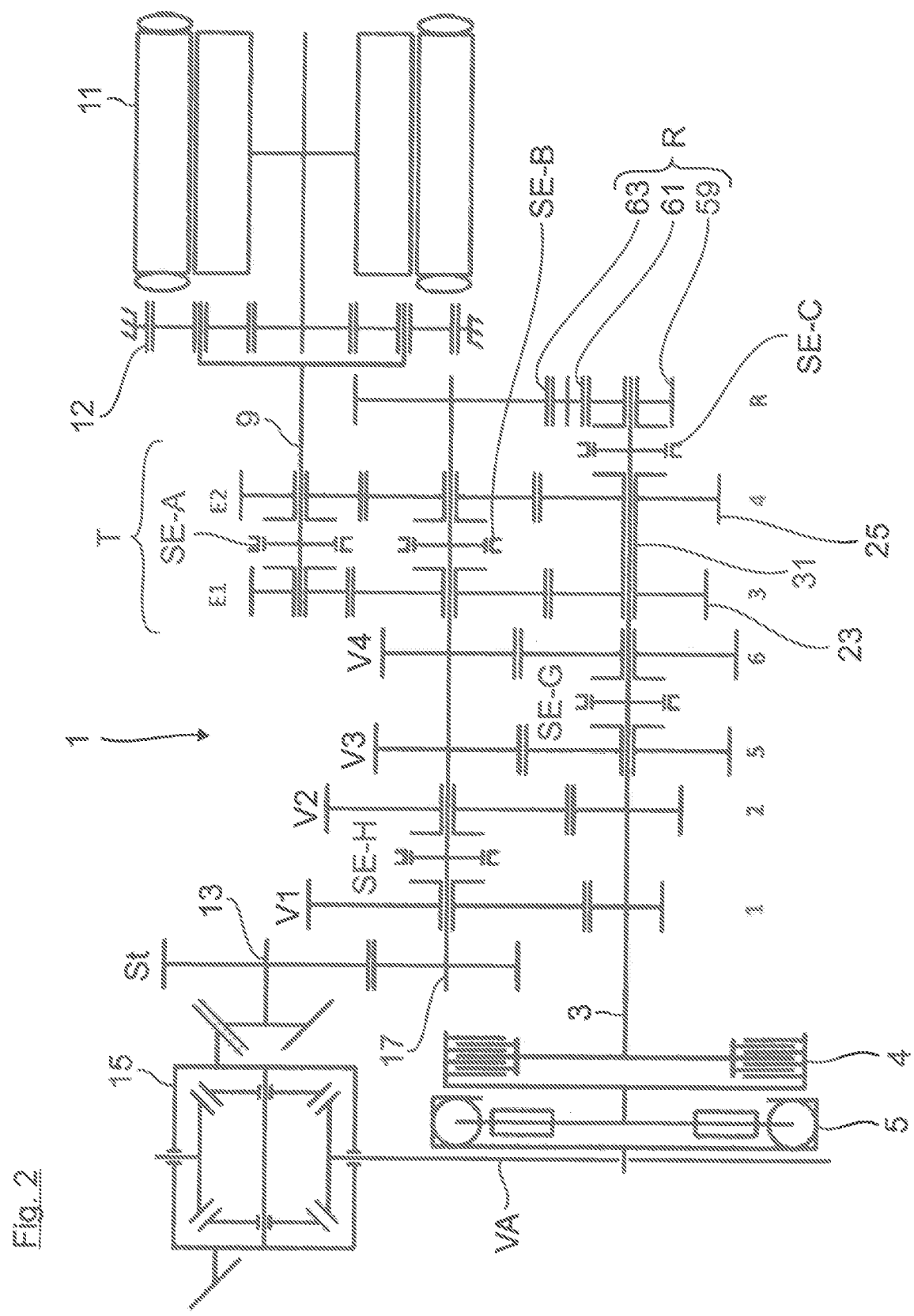
FIG. 2 in a view corresponding to FIG. 1, a second embodiment of the hybrid transmission.

In contrast thereto, in FIG. 2, the transmission 1 has an additional reverse-gear gear plane R which is designed as a spur gear set. The reverse-gear gear plane R is constructed from a drive-side gear wheel 59 which is loosely mounted on the internal combustion engine shaft 3, an intermediate gear wheel 61 meshing therewith, and a takeoff-side gear wheel 63 mounted in a rotationally fixed manner on the takeoff shaft 17 and which meshes with the intermediate gear wheel 61. The basic construction of the transmission structure shown in FIG. 6 has largely the same design as the transmission structure shown in FIG. 2, except for the additional reverse-gear gear plane R which is arranged in axial direction between the second hybrid gear plane E2 and the planetary reduction gearing 12. In addition, in FIG. 2, in contrast to FIG. 1, the shifting element SE-C is designed so that it can be shifted on both sides and it is positioned in axial direction between the drive-side hollow shaft 31 and the drive-side loose gear wheel 59. In a shifting actuation to the right, the internal combustion engine shaft 3 is drivingly connected to the reverse-gear plane R via the shifting element SE-C.

The invention relates to a hybrid drive train for a hybrid-driven vehicle, comprising a transmission (1), in particular a manual transmission, which can be shifted into different transmission stages by means of shifting elements and which can be drivingly connected to an internal combustion engine (7) via an internal combustion engine shaft (3), to an electric machine (11) via an electric machine shaft (9), and to at least one vehicle axle (VA) via an output shaft (13), wherein the internal combustion engine shaft (3) and a takeoff shaft (17), which is drivingly connected to the output shaft (13), can be connected together via spur gear sets which can be shifted by means of the shifting elements, each spur gear set forming a gear plane (V1 to V4, E1, E2), of which at least one hybrid gear plane (E1, E2) can additionally be connected to the electric machine shaft (9). According to the invention, the hybrid gear plane (E1, E2) is part of a sub-transmission (T) which has shifting elements (SE-A, SE-B, SE-C), by means of which the sub-transmission (T) can be decoupled from the drive train or can be coupled thereto during operation of the transmission.

The invention claimed is:

1. A hybrid drive train for a hybrid-driven vehicle, comprising:
a transmission which can be shifted into different transmission stages by shifting elements and which can be drivingly connected to an internal combustion engine via an internal combustion engine shaft, to an electric machine via an electric machine shaft, and to at least one vehicle axle via an output shaft, wherein the internal combustion engine shaft and a takeoff shaft, which is drivingly connected to the output shaft, can be connected together via spur gear sets which can be shifted by the shifting elements, each spur gear set forming a gear plane, of which at least one hybrid gear plane can additionally be connected to the electric machine shaft, wherein the hybrid gear plane is part of a sub-transmission which has shifting elements, by which the sub-transmission can be decoupled from the drive train or can be coupled thereto during operation of the transmission, wherein the hybrid gear plane has a takeoff-side gear wheel arranged on the takeoff shaft, a drive-side gear wheel arranged on the internal combustion engine shaft, and an electric machine-side gear wheel, and wherein the electric machine-side gear wheel is rotatably mounted as a loose gear wheel coaxially on the electric machine shaft, and a non-powershift synchronization can be decoupled from the electric machine shaft or can be coupled thereto by a first shifting element, and in that the takeoff-side gear wheel of the at least one hybrid gear plane, which is arranged on the takeoff shaft, is a loose gear wheel which can be coupled to the takeoff shaft or can be coupled thereto by a second shifting element, and/or in that the drive-side gear wheel of the hybrid gear plane, which is arranged on the internal combustion engine shaft, is a loose gear wheel which can be coupled to the internal combustion engine shaft by a third shifting element, wherein the sub-transmission has exactly two hybrid gear planes and wherein the first shifting element arranged on the electric machine shaft can be shifted on both sides and is arranged in an axial direction between the loose gear wheel of each of the two hybrid gear planes, wherein, in a neutral position, the first shifting element is decoupled from the two hybrid gear planes, and the first shifting element either couples the loose gear wheel of the first hybrid gear plane to the electric machine shaft in a first shifting position or it couples the loose gear wheel of the second hybrid gear plane to the electric machine shaft in a second shifting position, wherein the two hybrid gear planes are components of the sub-transmission which can be immobilized during the operation of the transmission, that is to say decoupled from the drive train, and wherein, in the sub-transmission, the drive-side loose gear wheels of the two hybrid gear planes, arranged on the internal combustion engine shaft, are arranged together in a rotationally fixed manner on a hollow shaft which is rotationally mounted coaxially on the internal combustion engine shaft and which can be coupled to the internal combustion engine shaft via exactly the third shifting element.

2. The drive train according to claim 1, wherein the second shifting element arranged on the takeoff shaft can be shifted on both sides and is arranged in an axial direction between the takeoff side loose gear wheel of each of the two hybrid gear planes, wherein the shifting element either couples the takeoff-side loose gear wheel of the first hybrid gear plane to the takeoff shaft in a first shifting position or couples the takeoff-side loose gear wheel of the second hybrid gear plane to the takeoff shaft in a second shifting position.

3. The drive train according to claim 1, wherein the electric machine shaft is free of fixed gear wheels, arranged in a rotationally fixed manner thereon, of the spur gear sets forming the gear planes.

4. The drive train according to claim 1, wherein the takeoff shaft is connected via a spur gear stage to the output shaft and in that all the gear planes are arranged in the axial direction between the spur gear stage and the electric machine, and/or in that the at least one hybrid gear plane is arranged directly adjacently on the electric machine.

5. The drive train according to claim 1, wherein the electric machine is connected on a takeoff side and wherein, for the takeoff-side connection of the electric machine, an electric machine-side gear wheel of the at least one hybrid gear plane meshes with a takeoff-side loose gear wheel rotationally mounted on the takeoff shaft.

6. The drive train according to claim 1, wherein the electric machine is connected on a drive side and wherein, for the drive-side connection of the electric machine, an electric machine-side gear wheel of the at least one hybrid gear plane meshes with a drive-side loose gear wheel rotationally mounted on the internal combustion engine shaft.

* * * * *